No. 619,556. Patented Feb. 14, 1899.

W. FRASER.

BRAZELESS JOINT FOR CYCLE FRAMINGS.

(Application filed Dec. 20, 1897.)

(No Model.)

Witnesses.
Geo Luery
Alfred Frank Biddle

Inventor
William Fraser

THE NORRIS PETERS CO., PHOTO-LITHO., WASHINGTON, D. C.

UNITED STATES PATENT OFFICE.

WILLIAM FRASER, OF BIRMINGHAM, ENGLAND.

BRAZELESS JOINT FOR CYCLE-FRAMINGS.

SPECIFICATION forming part of Letters Patent No. 619,556, dated February 14, 1899.

Application filed December 20, 1897. Serial No. 662,641. (No model.)

*To all whom it may concern:*

Be it known that I, WILLIAM FRASER, engineer, a subject of the Queen of Great Britain, residing at Dovedale School Road, Moseley, Birmingham, in the county of Warwick, England, have invented a certain new and useful Brazeless Joint for Cycle-Framings and such Like, (for which I have obtained Letters Patent in Great Britain, No. 28,690, dated December 15, 1896,) of which the following is a specification.

This invention relates to the construction of cycle-frames and also to other machines and constructional objects; and it consists of an improved mechanical device for connecting or joining up one tubular part to another or one tubular part to a bracket-lug or its equivalent in such a manner that a perfect and permanent joining of the two parts is the result.

The primary object of the invention is to obviate the brazing of the ends of the tubular members into the sockets or junction lugs when constructing a cycle-frame. A brazed joint is an expensive device in consequence of the same requiring to be afterward trimmed or dressed, but further than that the brazing process both softens and weakens the joint just at the point where it should be strongest. Further, aluminium tubes and fittings have been practically abandoned on account of their inability of being satisfactorily brazed together. This invention is a mechanical device for joining up such tubular and socketed parts capable of being easily fitted and of reducing the cost of the joint's construction. The same is set forth in the accompanying sheet of drawings, its chief parts being a tapered socket for receiving the end of the tube, a nipple-cone or ferrule for expanding the tube end within the said socket, and an actual locking means, all constructed and arranged in the particular manner hereinafter set forth.

Figure 1:
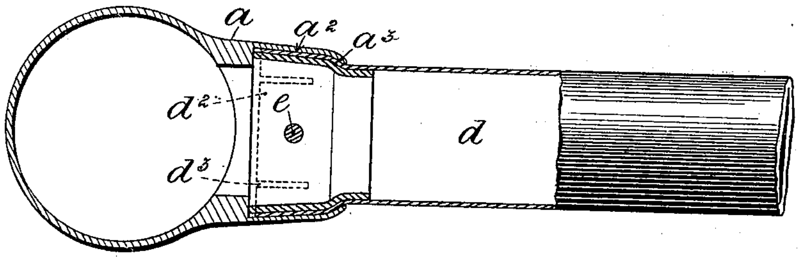
Figure 2:
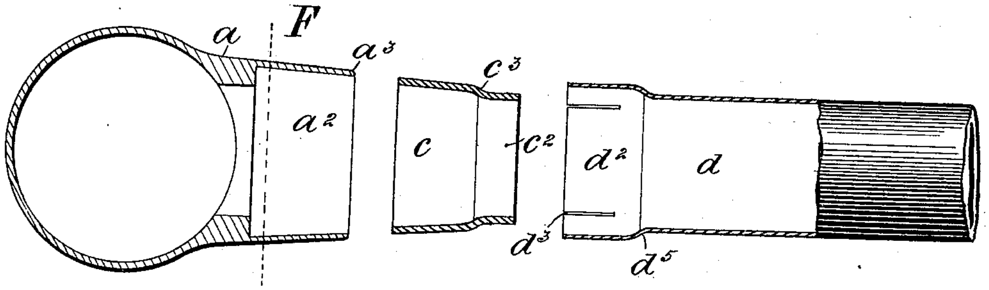
Figure 3:
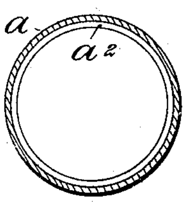
Figure 4:
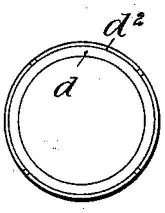
Figure 5:
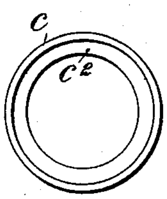

In the sheet of drawings the invention is shown applied to one of the bottom bracket-lugs of a cycle-frame, Figure 1 showing the joint made or the parts connected up, and Fig. 2 the joint before being made or the parts separate. Figs. 3, 5, and 4 show, respectively, a transverse section of the socket part on the dotted line F, an end elevation of the end of the tube, and an end elevation of the nipple, cone, or ferrule, the said figures showing the conical and parallel parts.

In this joint the bracket-lug $a$ is formed upon its inside into a cone or tapered socket $a^2$, the largest diameter being at the bottom of the said socket. The metal of the walls of the socket at its mouth $a^3$ is of such a nature to allow of its being closed in upon the tubular member of the joint subsequent to the primary connection of the parts for locking the connection, as shown in Fig. 1. A hollow and cylindrical coned ferrule or nipple $c$ of the same taper as the coned socket $a^2$ and having a cylindrical part $c^2$ upon its one end of a reduced diameter is adapted to loosely fit and seat itself within the socket $a^2$, as aforesaid, and to abut against the bottom of the said socket. A curved shoulder $c^3$ separates the small diameter part $c^2$ of the cone $c$ from its larger diameter-body, and when the said cone is within the socket this curved shoulder comes adjacent to the socket's mouth. The coned ferrule or nipple $c$ is of such a diameter as to leave between it and the socket $a^2$ when the said ferrule is seated therein a circumferential space of the same thickness as the walls of the tubular part to be connected to the said socket.

The tubular member $d$ of the cycle-framing, which is to be rigidly and permanently connected to the lug $a$, has its connection end $d^2$ formed of a larger diameter than the tube itself, and the walls of this enlarged part are longitudinally split for a short distance at $d^3$. A curved shoulder $d^5$ connects the enlarged part $d^2$ with the tube $d$, its formation being similar to the formation of the shoulder $d^3$ of the ferrule or nipple $c$. The walls of the enlarged part $d^2$ are parallel before being introduced into the socket $a^2$ and over the nipple or ferrule.

To make the joint from the parts, as shown in Fig. 2, first introduce the coned ferrule $c$ into the coned socket $a^2$ by way of its mouth. Then force by suitable pressure the enlarged end $d^2$ of the tube $d$ into the space between the socket's inner walls and the circumference of the coned ferrule until the curved shoulder $d^5$ of the tube comes against the curved shoulder $c^3$ of the cone $c$, the lug $a$ being held all the time in a jig. This forcing in of the enlarged split tube opens out or expands the said enlarged end, forcing it to conform to the taper of the socket and the coned ferrule and to be wedged between them. By a suitable tool the metal $a^3$ at the mouth of the coned socket $a^2$ is now spun or closed over the curved shoulder $d^5$ of the tube $d$, which prevents any possibility of the tube being withdrawn.

As an extra precaution against the joint becoming loosened a cross-peg $e$ may be driven through the parts, or the parts may be locked as follows:

The tube $d$ is laid hold of by gas-pliers or the like and given a slight back-and-forth rotation, which by the tremendous friction excited between the coned surfaces causes the latter to be ripped up or damaged, resulting in a fusing of the tube, ferrule, and socket.

Having now described my invention, what I claim, and desire to secure by Letters Patent, is—

In a mechanical joint, the combination of a conical socket part $a^2$, of a larger diameter at its bottom than at its mouth, a coned nipple or ferrule $c$ seated within the said socket and loosely fitting the same so as to leave a circumferential space between it and the said socket, the said cone also having a reduced part $c^2$ and a curved shoulder $c^3$, and a tube $d$, having an enlarged split end $d^2$ and a curved shoulder $d^5$, forced into the circumferential space between the coned socket and the nipple or ferrule $c$, and having its split end expanded and closed in by the said socket, substantially as described.

In testimony whereof I have signed this specification in the presence of two subscribing witnesses.

WILLIAM FRASER.

Witnesses:
GEO. AVERY,
A. F. BIDDLE.